(12) United States Patent
Arai et al.

(10) Patent No.: US 12,404,773 B2
(45) Date of Patent: Sep. 2, 2025

(54) GAS TURBINE ENGINE

(71) Applicant: KAWASAKI JUKOGYO KABUSHIKI KAISHA, Kobe (JP)

(72) Inventors: Hiromitsu Arai, Kobe (JP); Ryozo Tanaka, Kobe (JP); Tomoki Taniguchi, Kobe (JP); Yoshihiko Mutou, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/755,155

(22) Filed: Jun. 26, 2024

(65) Prior Publication Data

US 2024/0344482 A1     Oct. 17, 2024

Related U.S. Application Data

(63) Continuation of application No. PCT/JP2022/045179, filed on Dec. 7, 2022.

(30) Foreign Application Priority Data

Dec. 27, 2021   (JP) ................ 2021-212733

(51) Int. Cl.
*F01D 5/08* (2006.01)
*F02C 7/18* (2006.01)
*F02C 7/05* (2006.01)
*F02C 7/052* (2006.01)
*F23R 3/14* (2006.01)

(52) U.S. Cl.
CPC ............ *F01D 5/081* (2013.01); *F02C 7/18* (2013.01); *F02C 7/05* (2013.01); *F02C 7/052* (2013.01); *F05D 2260/232* (2013.01); *F05D 2260/607* (2013.01); *F23R 3/14* (2013.01)

(58) Field of Classification Search
CPC .... F01D 5/081; F02C 7/18; F02C 7/05; F02C 7/052; F05D 2260/607
See application file for complete search history.

(56) References Cited

U.S. PATENT DOCUMENTS

| | | | |
|---|---|---|---|
| 4,527,387 | A  | 7/1985 | Lastrina et al. |
| 9,359,958 | B2 | 6/2016 | Mutou et al. |
| 9,915,176 | B2 | 3/2018 | Murray et al. |
| 10,167,725 | B2 | 1/2019 | Manning et al. |

(Continued)

FOREIGN PATENT DOCUMENTS

| | | |
|---|---|---|
| JP | 59-108827 A | 6/1984 |
| JP | 2011-196356 A | 10/2011 |

*Primary Examiner* — Gerald L Sung
*Assistant Examiner* — Rene D Ford
(74) *Attorney, Agent, or Firm* — Sughrue Mion, PLLC

(57) ABSTRACT

A gas turbine engine includes a cooling air supply passage that feeds air from a compressor, as a cooling medium, to a turbine by swirling the air in a circumferential direction. The cooling air supply passage includes an entry zone to which the air enters, and a swirl zone in which the air flowing past the entry zone is circumferentially redirected. The gas turbine engine also includes a chamber branching from the swirl zone to capture foreign particles in the air. The chamber is formed to meet the relation: $\alpha \geq \beta$ where, when viewed in a radial direction, $\alpha$ is an angle defined by the swirl zone relative to a horizontal direction and $\beta$ is an angle defined between the chamber and the swirl zone.

5 Claims, 6 Drawing Sheets

(56) References Cited

U.S. PATENT DOCUMENTS

| | | |
|---|---|---|
| 2013/0200571 A1 | 8/2013 | Mutou et al. |
| 2016/0123154 A1* | 5/2016 | Manning ................. F01D 5/147 |
| | | 416/90 R |
| 2017/0082026 A1* | 3/2017 | Zelesky .................... F02C 7/18 |
| 2017/0122202 A1* | 5/2017 | Rahaim .................... F01D 5/08 |

* cited by examiner

GAS TURBINE ENGINE

CROSS REFERENCE TO THE RELATED APPLICATION

This application is a continuation application, under 35 U.S.C. § 111 (a) of international patent application No. PCT/JP2022/045179, filed Dec. 7, 2022, which claims priority to a Japanese patent application No. 2021-212733 filed Dec. 27, 2021, the entire disclosures of all of which are herein incorporated by reference as a part of this application.

BACKGROUND OF THE INVENTION

Field of the Invention

The present disclosure relates to a gas turbine engine.

Description of Related Art

In a gas turbine engine, a combustor produces combustion gas which is fed to and actuates a turbine. Thus, the turbine experiences extremely high temperatures. One approach to address this is to provide, for example, cooling passages that penetrate the rotor blades of a turbine to cool the components of the turbine by utilizing air from a compressor as a cooling medium (see, for example, Patent Document 1).

RELATED DOCUMENT

Patent Document

[Patent Document 1] JP Laid-open Patent Publication No. 2011-196356

If the clearance between the rotor blades of a compressor and its housing is to be minimized for a higher efficiency of a gas turbine engine, there is a chance that rubbing (or friction) may occur, among others, between these components and thereby produce foreign particles. These foreign particles appearing at a point (e.g., the compressor) in the gas turbine engine that is upstream of passages that deliver cooling air will, if left untreated, build up and clog the cooling air passages, and lead to a risk that the turbine cannot be cooled in a satisfactory manner.

SUMMARY OF THE INVENTION

Thus, an object of the present disclosure is to provide a gas turbine engine which can get rid of foreign particles that has entered the air used for cooling a turbine, in order to overcome the abovementioned drawbacks.

To achieve the above object, the present disclosure provides a gas turbine engine which includes: a compressor which pressurizes air taken in from an ambient environment; a combustor which combusts an air-fuel mixture containing a fuel and the air pressurized by the compressor; a turbine powered by combustion gas produced by the combustor; and a cooling air supply passage which feeds the air from the compressor, as a cooling medium, to the turbine by swirling the air in a circumferential direction. The cooling air supply passage includes: an entry zone to which the air enters; and a swirl zone in which the air flowing past the entry zone is circumferentially redirected. The gas turbine engine also includes a chamber which branches from the swirl zone and captures foreign particles in the air. The chamber is formed to meet the relation: $\alpha \geq \beta$ where, when viewed in a radial direction, $\alpha$ is an angle defined by the swirl zone relative to a horizontal direction and $\beta$ is an angle defined between the chamber and the swirl zone.

A gas turbine engine according to the present disclosure can get rid of foreign particles that has entered the air used for cooling the turbine.

Any combinations of at least two features disclosed in the claims and/or the specification and/or the drawings should also be construed as encompassed by the present disclosure. Especially, any combinations of two or more of the claims should also be construed as encompassed by the present disclosure.

BRIEF DESCRIPTION OF THE DRAWINGS

The present disclosure will be more clearly understood from the following description of preferred embodiments made by referring to the accompanying drawings. However, the embodiments and the drawings are given merely for the purpose of illustration and explanation, and should not be used to delimit the scope of the present disclosure, which scope is to be delimited by the appended claims. In the accompanying drawings, alike numerals are assigned to and indicate alike parts throughout the different figures, and:

DESCRIPTION OF EMBODIMENTS

Figure 1:
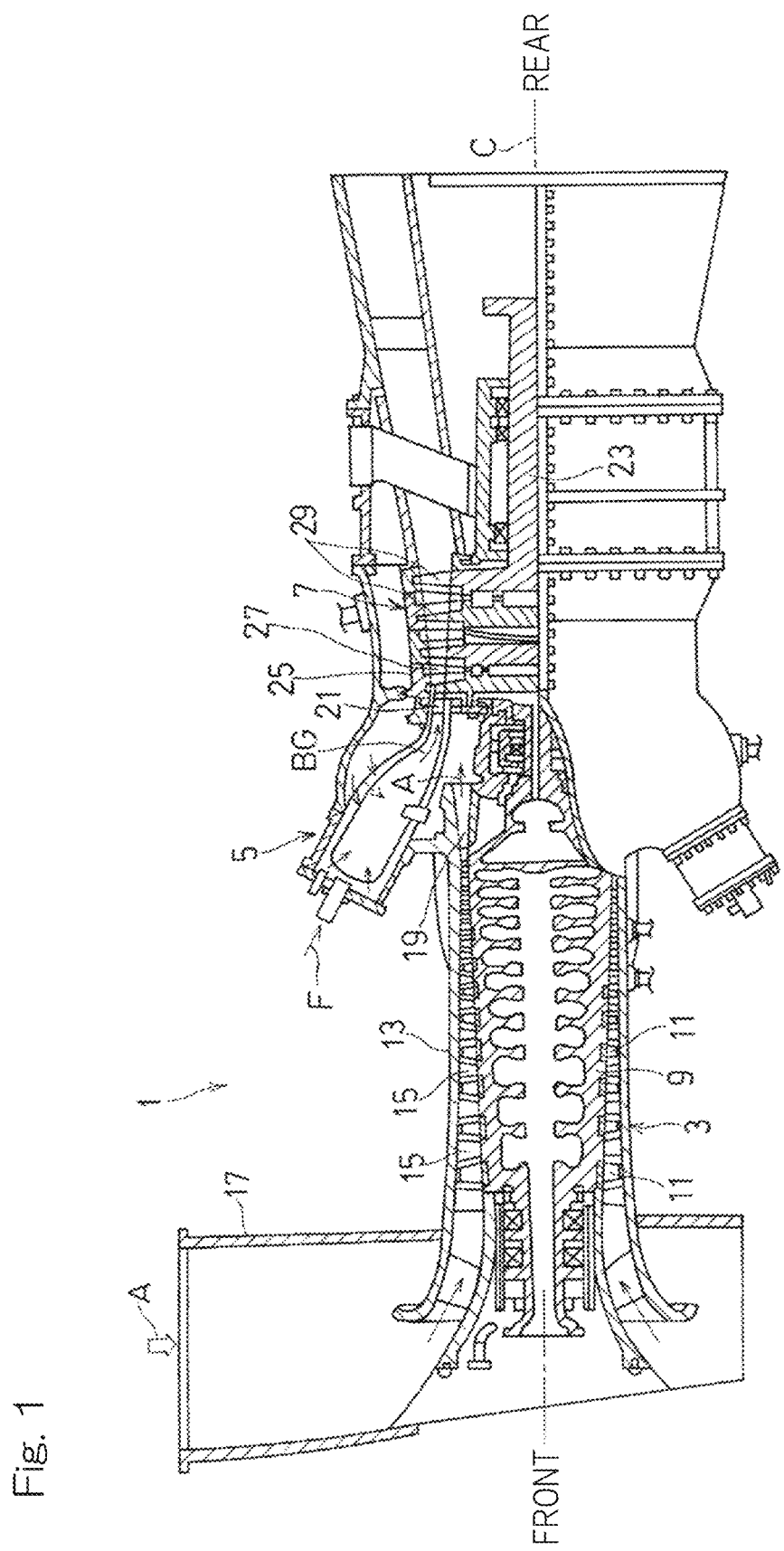
FIG. 1 shows a partial cutaway side view of a gas turbine engine in accordance with an embodiment of the present disclosure.

What follows is a description of preferred embodiments of the present disclosure, made on the basis of the drawings. FIG. 1 depicts a gas turbine engine 1 in accordance with an embodiment of the present disclosure (hereinafter simply referred to as a "gas turbine.") In the gas turbine 1, air A taken in from the ambient environment is pressurized by a compressor 3 and guided to a combustor 5 in which an air-fuel mixture containing a fuel F and the pressurized air A is combusted to produce high-temperature and high-pressure combustion gas BG to power a turbine 7.

In the following discussions, it should be noted that, in an axial direction of the gas turbine 1, the side of the gas turbine 1 that has the compressor 3 is referred to as a "front" side, whereas the side of the gas turbine 1 that has the turbine 7 is referred to as a "rear" side. Further, in the following discussions, the terms "axial" direction and "axially," "radial" direction and "radially," and "circumferential"

direction and "circumferentially" respectively indicate the axial direction, the radial direction, and the circumferential direction of the gas turbine 1, unless otherwise noted.

In the instant embodiment, the compressor 3 used is an axial-flow compressor. The compressor 3 includes a compressor rotor 9, a compressor housing 13, a plurality of compressor rotor blades 11 embedded in the outer peripheral side of the compressor rotor 9, and a plurality of compressor stator vanes 15 located on the inner peripheral side of the compressor housing 13. Through the cooperation of the rotor blades 11 and the stator vanes 15, the compressor 3 pressurizes the air taken in through an air intake duct 17. Located downstream of the compressor 3 is a diffuser 19. The air pressurized by the compressor 3 exits the diffuser 19 and is delivered to the combustor 5 as pressurized air A.

The combustor 5 mixes the fuel F into the pressurized air A delivered from the compressor 3 and combusts the resultant, and produces the high-temperature and high-pressure combustion gas BG. The combustion gas BG produced by the combustor 5 flows through a turbine stator vane 21 (or a first-stage turbine stator vane) into the turbine 7.

The turbine 7 includes a turbine rotor 23 and a turbine casing 25 enclosing the turbine rotor 23. A plurality of turbine stator vanes 27 are mounted to the inner peripheral part of the turbine casing 25 at predetermined distances. Meanwhile, a plurality of turbine rotor blades 29 are disposed on the outer peripheral part of the turbine rotor 23 such that they are each arranged downstream of corresponding stages of the turbine stator vanes 27.

Figure 2:
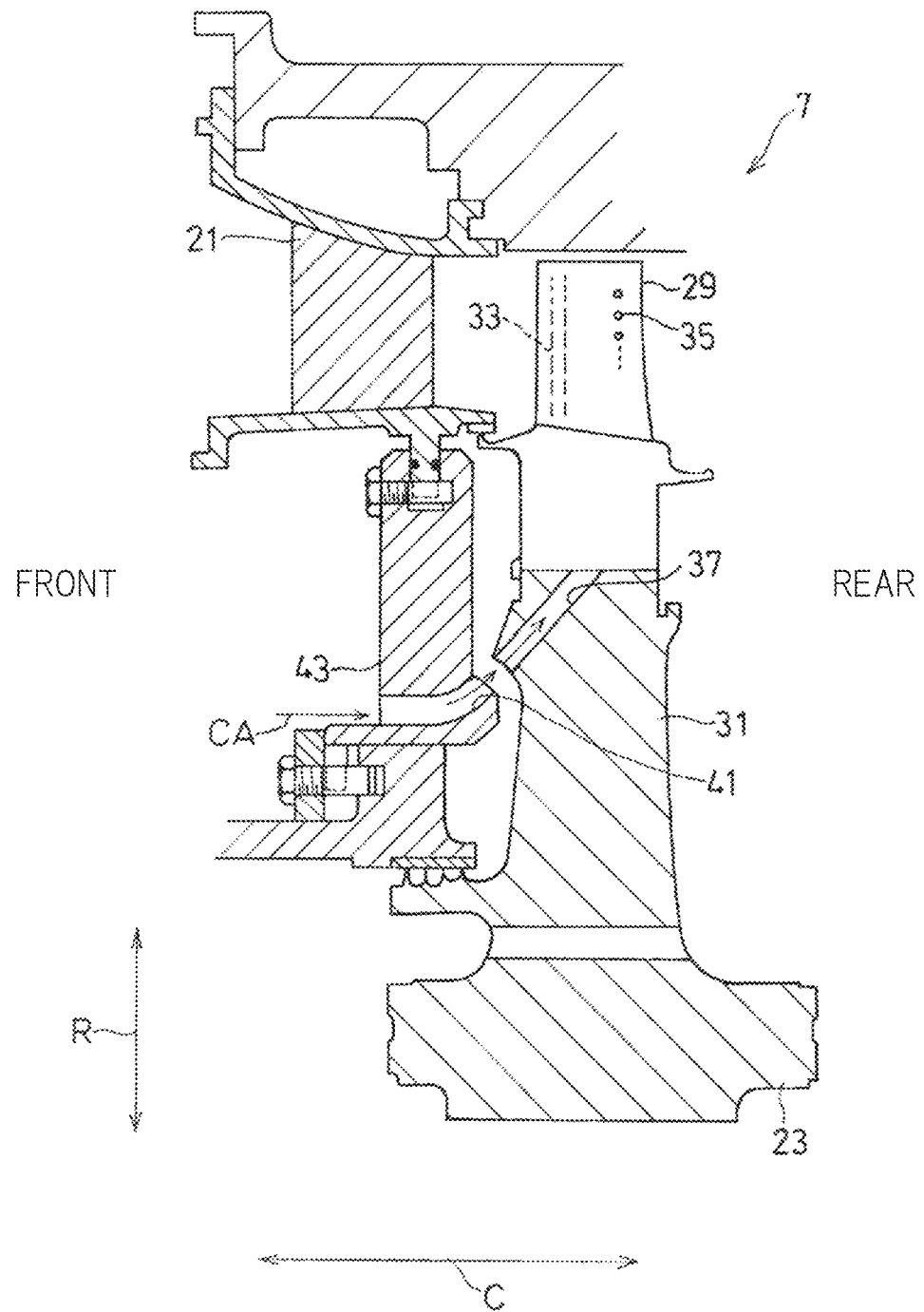
FIG. 2 shows a vertical cross-sectional view of the gas turbine engine of FIG. 1 on an enlarged scale, illustrating the environment surrounding a cooling air supply passage.

Turning to FIG. 2, the turbine rotor blades 29 are embedded in the outer peripheral part of a rotor disk 31 that is disposed on the outer periphery of the turbine rotor 23. In the instant example, the turbine rotor blades 29 include a mechanism to cool the turbine rotor blades 29 themselves. More specifically, the turbine rotor blades 29 include: turbine rotor blade internal cooling passages 33 through which cooling air CA internally cools the turbine rotor blades 29; and film cooling holes 35 via which the air from the turbine rotor blade internal cooling passages 33 is utilized to facilitate film cooling of the outer wall surfaces of the turbine rotor blades 29 at the trailing edges thereof. The rotor disk 31 includes cooling air guide passages 37 through which the air used to cool the turbine rotor blades 29 is guided towards the turbine rotor blade internal cooling passages 33.

Figure 3:
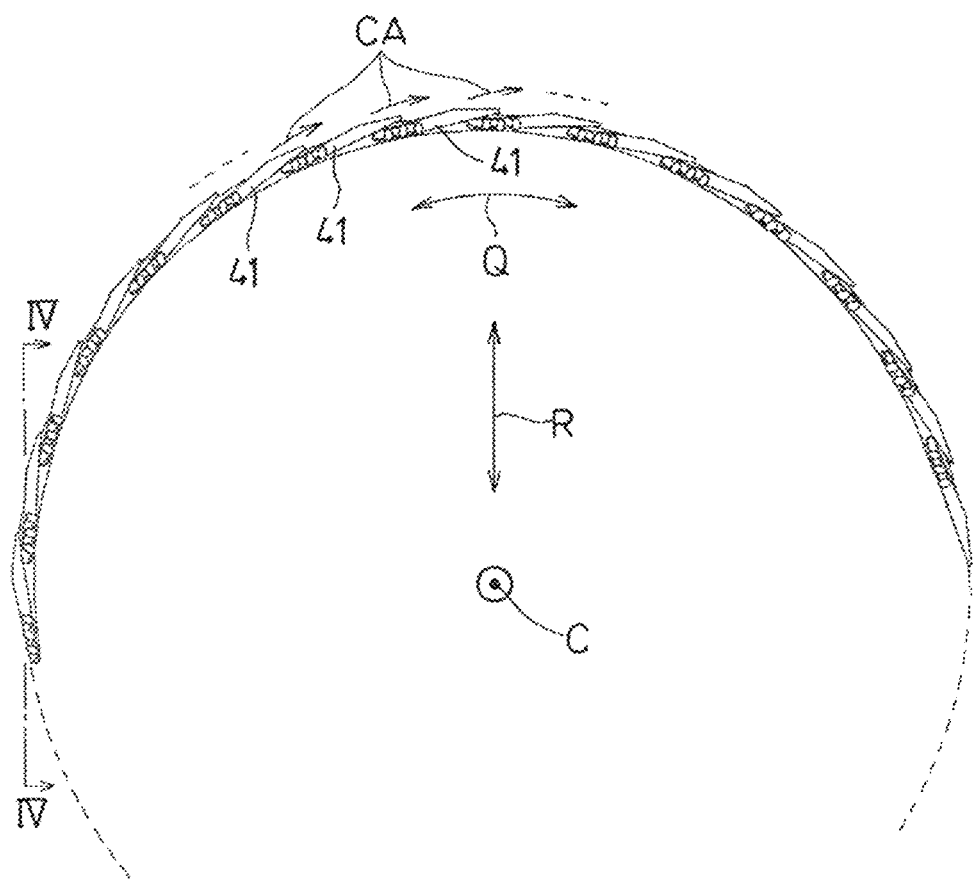
FIG. 3 shows a front elevational view of cooling air supply passages of the gas turbine engine of FIG. 1.

In the instant embodiment, the gas turbine comprises cooling air supply passages 41 which feeds the air from the compressor 3 (FIG. 1), as a cooling medium (i.e., the cooling air CA), to the turbine 7 by swirling the air in the circumferential direction. As illustrated in FIG. 3, a plurality of cooling air supply passages 41 are arranged adjacently in the circumferential direction Q. In the example shown in FIG. 2, the cooling air CA is supplied from the cooling air supply passages 41 into the cooling air guide passages 37 of the rotor disk 31. It should be understood, however, that the illustrated example is merely one of the non-limiting examples of the cooling structure of the turbine 7. The cooling air CA from the cooling air supply passages 41 may be supplied to any point of interest as desired, depending on the cooling structure of the turbine 7.

More specifically, in the instant embodiment, the cooling air supply passages 41 are arranged in a pre-swirl nozzle member 43. The pre-swirl nozzle member 43 comprises a ring-shaped block element that includes a plurality of cooling air supply bores defined therein, which form the cooling air supply passages 41. In the illustrated example, the pre-swirl nozzle member 43 is positioned at an axial location which is rearward of the diffuser 19 and forward of the rotor disk 31. In addition, in the instant example, the pre-swirl nozzle member 43 is arranged radially inwards of a turbine stator vane 21.

Figure 4:
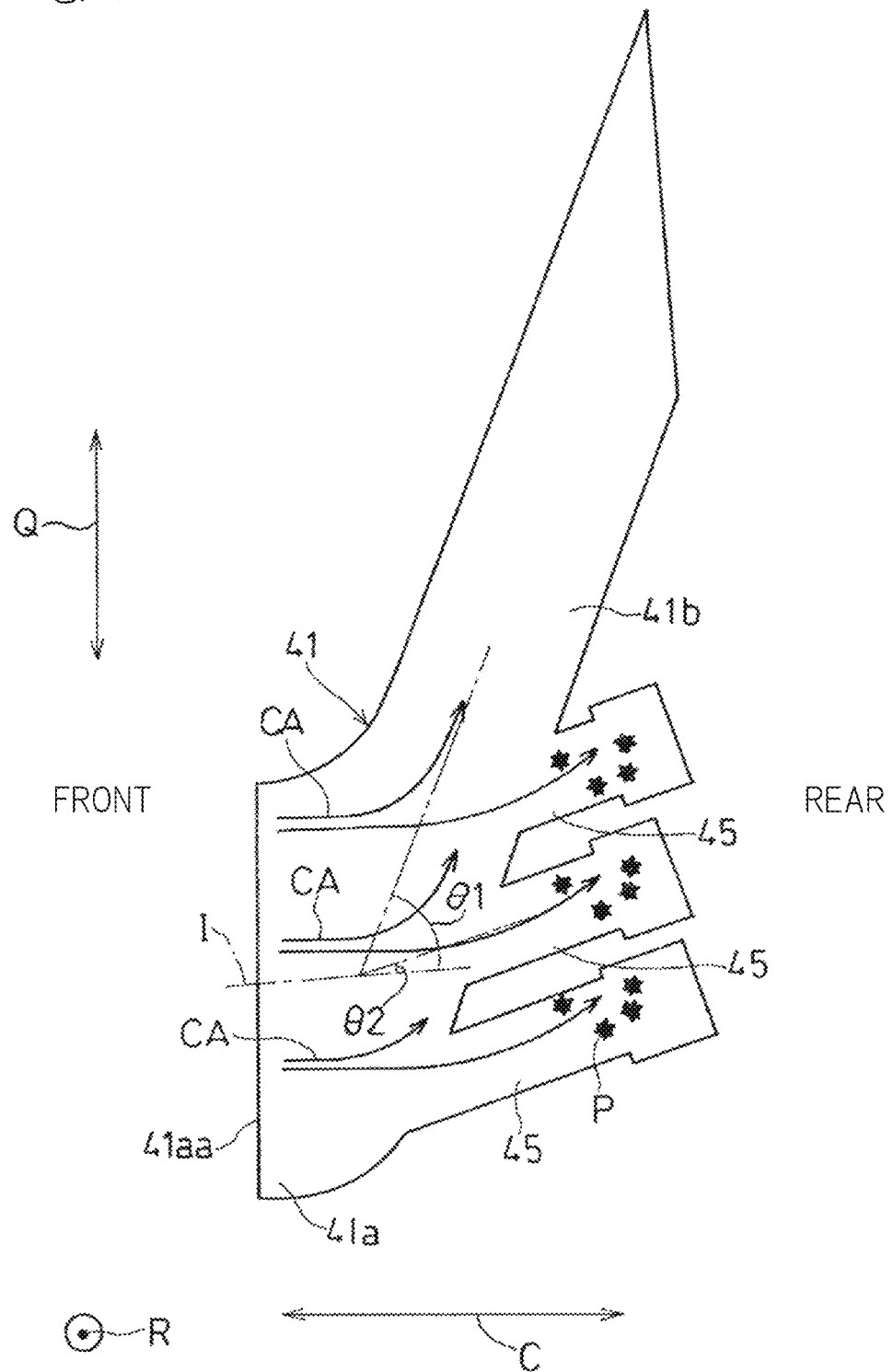
FIG. 4 shows a cross-sectional view of a cooling air supply passage and chambers of the gas turbine engine of FIG. 1, taken along the line IV-IV of FIG. 3.

Turning to FIG. 4, each of the cooling air supply passages 41 includes: an entry zone 41a defining an inlet 41aa for the cooling air CA into a respective cooling air supply passage 41; and a swirl zone 41b in which the cooling air CA flowing past the entry zone 41a is circumferentially redirected. In the illustrated example, the entry zone 41a is formed as a channel slightly angled towards the circumferential direction Q relative to the axial direction C. The swirl zone 41b is formed as a channel deflecting from the entry direction I into the entry zone 41a by an angle θ1 (hereinafter referred to as a "first deflection angle") towards the circumferential direction Q. The term "entry direction I" in this context means the primary direction of flow of the cooling air CA at the inlet 41aa of a cooling air supply passage. It should be noted that the first deflection angle θ1 is smaller than 90 degrees. As a result of the plurality of cooling air supply passages 41 having the above construction being adjacently arranged in the circumferential direction Q as shown in FIG. 3, the cooling air CA in the form of swirling flow in the circumferential direction Q is delivered to the side of the turbine 7 in FIG. 2. In the instant embodiment, the swirl zone 41b of a cooling air supply passage 41 is formed as a channel deflecting outwards in the radial direction R from the axial direction C in an orientation substantially coinciding with a respective one of the cooling air guide passages 37 of the rotor disk 31.

As illustrated in FIG. 4, the gas turbine 1 in accordance with the instant embodiment further includes chambers 45 which captures foreign particles P in the cooling air CA. The chambers 45 branches from the swirl zone 41b of the cooling air supply passage 41. In particular, the chambers 45 branch from an upstream portion of the swirl zone 41b, namely, a portion of the swirl zone 41b that is proximate to the entry zone 41a.

The chambers 45 captures the foreign particles P in the cooling air CA by taking advantage of the difference between the cooling air CA and the foreign particles P in the force of inertia that acts them when the cooling air CA with the foreign particles P is being redirected from the entry zone 41a to the swirl zone 41b. In particular, the angle θ2 defined between the direction of flow in the entry zone 41a of a cooling air supply passage 41 and the direction of flow into a chamber 45 (hereinafter referred to as a "second deflection angle") is smaller than the first deflection angle θ1. In other words, in the illustrated example, the chambers 45 branch rearwardly from the swirl zone 41b. Consequently, when the cooling air CA is being redirected from the entry zone 41a to the swirl zone 41b, the foreign particles P in the cooling air CA experience a greater force of inertia due to their difference in density and, as a result, flow tangentially to the swirling flow and, then, into the chambers 45. Due to the swirls that appear inside the chamber 45, the foreign particles P flowing into the chambers 45 get adhered to the inner wall surfaces of the chambers 45 and are thereby held captive within the chambers 45.

Figure 5A:
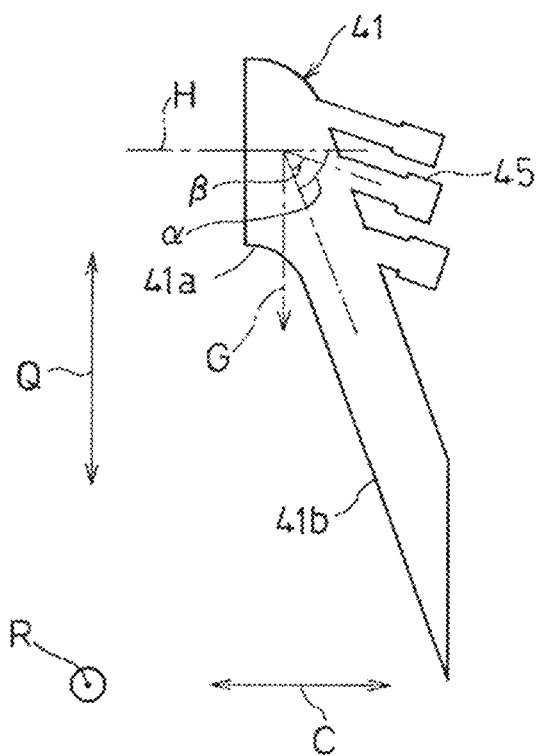
FIG. 5A shows a cross-sectional view of a cooling air supply passage of the gas turbine engine of FIG. 1, when it is facing in a downward orientation.

Turning to FIG. 5A, the chambers 45 in the instant embodiment are formed to meet the relation: α≥β where, when viewed in the radial direction R, α is an angle defined by the swirl zone 41b of a cooling air supply passage 41 relative to the horizontal direction H (hereinafter referred to as a "swirl zone angle" for convenience) and β is an angle defined between a chamber 45 and the swirl zone 41b (hereinafter referred to as a "chamber angle" for convenience). It should be noted that the angle α equals to θ1 when the abovementioned entry direction I (FIG. 4) corresponds to the horizontal direction H.

Figure 5B:
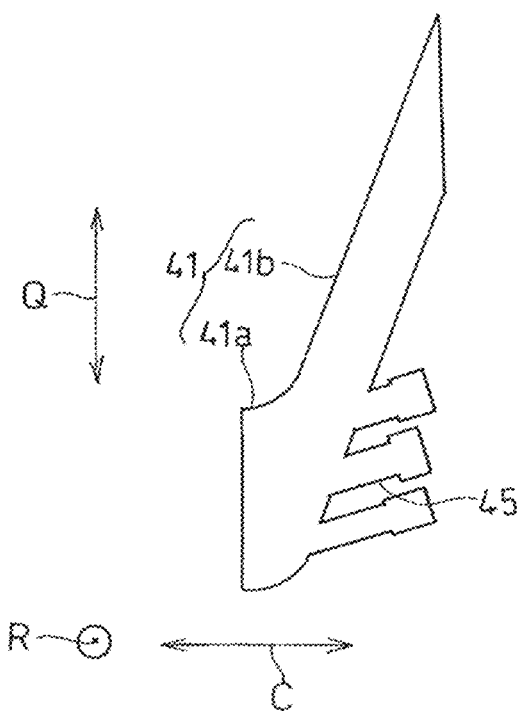
FIG. 5B shows a cross-sectional view of a cooling air supply passage of the gas turbine engine of FIG. 1, when it is facing in an upward orientation.

By setting the swirl zone angle α and the chamber angle β so that the relation: α≥β is met, the foreign particles P held captive within the chambers 45 are prevented from falling off to the downstream side of a cooling air supply passage 41, i.e., to the side of the turbine 7, from which they can no longer be captured again, when the gas turbine 1 has stopped. More specifically, when the gas turbine 1 is not in operation, the gravitational force G would be the only factor that causes any displacement of the foreign particles P. Hence, thanks to the relation: α≥β, the foreign particles P are prevented from falling off to the interior of a cooling air supply passage 41 when the cooling air supply passage 41 is in such a position where the downstream end of the cooling air supply passage 41 faces in a downward orientation as shown in FIG. 5A. It should be noted that the relation: α≥β may result in the foreign particles P falling off to the interior of a cooling air supply passage 41 when the cooling air supply passage 41 is in such a position where the downstream end of the cooling air supply passage 41 faces in an upward orientation as shown in FIG. 5B. Yet, since they would drop into a portion within the cooling air supply passage 41 that is upstream of the chambers 45, they can be captured into the chambers 45 again once the gas turbine 1 resumes its operation.

Figure 6:
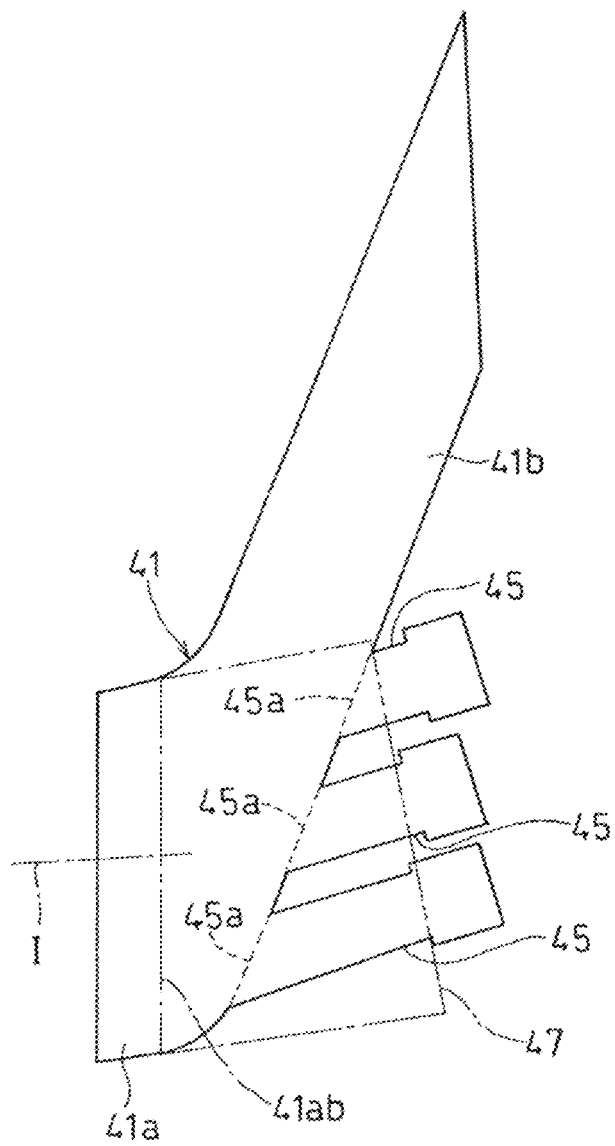
FIG. 6 shows a vertical cross-sectional view of the gas turbine engine of FIG. 1 on an enlarged scale, illustrating a cooling air supply passage.

In the example illustrated in FIG. 4, a plurality of chambers 45 (which are, in the instant embodiment, three chambers 45) are provided at the rear wall side of the swirl zone 41*b* along the longitudinal direction of the swirl zone 41*b*. As illustrated in FIG. 6, the plurality of chambers 45 are arranged such that the entrances 45*a* of all of the chambers 45 are entirely positioned within a projection 47 of the passage cross section of the end 41*ab* of the entry zone 41*a* (i.e., the boarder between the entry zone 41*a* and the swirl zone 41*b*) that is made in the entry direction I. It should be noted that the phrase "the end 41*ab* of the entry zone 41*a*" refers to a point in the entry zone 41*a* at which a straight segment of the entry zone 41*a* terminates in a vertical cross-sectional view of the passage internal wall surface. Although it is not mandatory to arrange the chambers 45 this way, it is preferred that the entrances 45*a* of the plurality of chambers 45 are arranged to be at least partially positioned within the projection 47 of the passage cross section of the end 41*ab* of the entry zone 41*a* that is made in the entry direction I. By adopting these configurations, it is possible to increase the probability of capture of the foreign particles P from the cooling air CA.

It should be noted that it is not a requirement that there be provided more than one chamber 45. A single chamber 45 may be provided instead. In this case, it is still preferred that the entrance 45*a* of the chamber 45 is at least partially, and more preferably entirely, positioned within the projection 47 of the passage cross section of the end 41*ab* of the entry zone 41*a* that is made in the entry direction I.

The chambers 45 in the instant embodiment are defined by circular cavities provided in the pre-swirl nozzle member 43 (FIG. 2). The chambers 45 may be defined by geometries other than circular cavities and can have a cross-sectional shape that is, for example, oblong or rectangular. Yet, when defined by circular cavities, the chambers 45 can be more easily formed in the pre-swirl nozzle member 43 or other similar block elements. Further, when the chambers 45 are defined by circular cavities, it is preferred to provide as many chambers 45 that can be deployed as possible while addressing the following factors: (i) the diameters of the circular cavities versus the channel width of the swirl zone 41*b*; (ii) the positioning of the entrances 45*a* of the chambers 45 within the projection 47 of the passage cross section of the end of the entry zone 41*a* that is made in the entry direction I as described above; and (iii) the distance between neighboring chambers 45.

It should be noted that, as an alternative to the provision of the plurality of chambers 45 in the manner shown in FIG. 6, a chamber 45 defined by an oblong hole geometry that covers an area corresponding to the plurality of chambers 45 can be provided instead. Attention should be paid to the fact that, if the ratio of the sectional area of the entrance 45*a* of a chamber 45 to the length dimension of the chamber 45 (or the dimension of depth from the entrance 45*a* of the chamber 45) is large, a greater percentage of the foreign particles P which have flown into the chamber 45 may get flown out into a cooling air supply passage 41 before being held captive within the chamber 45 by being swirled off together with air. For this reason and from this perspective, the provision of a large number of chambers 45 with a smaller entrance sectional area is preferred over the provision of a small number of chambers 45 with a larger entrance sectional area.

Figure 7:
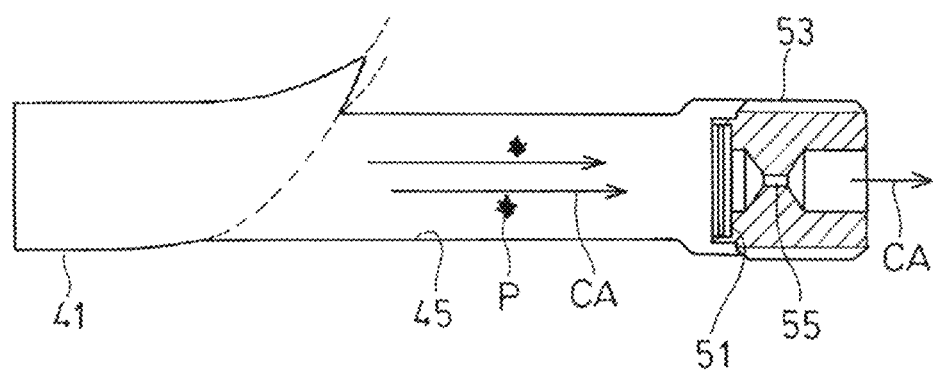
FIG. 7 shows a cross-sectional view of a filter and a flow rate regulator mechanism that are employed for a chamber of the gas turbine engine of FIG. 1.

Turning to FIG. 7, the chambers 45 in the instant embodiment include a filter 51 that captures the foreign particles P flowing into the chambers 45 while allowing the cooling air CA to pass through the filter 51. The filter 51 is detachably arranged in or at the chambers 45. More specifically, a cap 53 equipped with the filter is fitted to the downstream end of a chamber 45. Any filter can be used as the filter 51 as long as it can handle foreign particles P with a presumed size of interest (e.g., approximately in the range of several tens to 100 μm).

In addition, the chambers 45 include, at the downstream end thereof, a flow rate regulator mechanism 55 that regulates the flow rate of the cooling air CA exiting the chambers 45. In the instant example, the filter 51 is attached to the upstream end of the cap 53 and an orifice is provided at a portion of the cap 53 that is located downstream of the filter 51 to serve as the flow rate regulator mechanism 55.

By arranging the filter 51 in or at the chambers 45, the foreign particles P can be captured in a more efficient manner. Further, by arranging the filter 51 in or at the chambers 45 in a detachable way, replacement and maintenance of the filter 51 become easy. It should be noted that, even when the filter 51 is omitted from a chamber 45, it is still preferred that the downstream end of the chamber 45 is capped with the detachably mountable cap 53. This facilitates maintenance work for the interiors of the chambers 45.

It should be noted that, even when the cap 53 comes with the filter 51, it is not mandatory to provide the flow rate regulator mechanism 55 downstream of the filter 51. An air relief (e.g., a hole communicating with the exterior of a chamber 45) via which air can flow out of a chamber 45 at the downstream side thereof may alternatively be provided. By such an air relief, a negative pressure can be created within the chambers 45 to generate a force that holds the foreign particles P within the chambers 45. Nevertheless, by the flow rate regulator mechanism 55, it becomes easier to set a proper flow rate for achieving efficient capture of the foreign particles P, that is, a flow rate that can, by means of the flow rate regulator mechanism 55, compensate for the loss of flow in a cooling air supply passage 41 that is caused by the provision of the chambers 45 to achieve effective capture of the foreign particles P.

Note that, while the instant embodiment has been discussed in connection with an example in which the swirl zone 41*b* of a cooling air supply passage 41 in the pre-swirl nozzle member 43 is formed as a channel deflecting outwards in the radial direction R from the axial direction C in an orientation substantially coinciding with a respective one of the cooling air guide passages 37 of the rotor disk 31 as shown in FIG. 2, this is merely one of the non-limiting examples of the configuration of a cooling air supply passage 41 provided in the pre-swirl nozzle member 43. For instance, the swirl zone 41b of a cooling air supply passage 41 in the pre-swirl nozzle member 43 may extend straight with no deflection in the radial direction R or may be deflected inwards in the radial direction R.

Further, while the instant embodiment has been discussed in connection with an example in which the cooling air supply passages 41 are provided in the pre-swirl nozzle member 43, the use of the pre-swirl nozzle member 43 is not mandatory. For instance, the cooling air supply passages 41 may alternatively be defined by a swirler having a plurality of swirling vanes.

Furthermore, while the instant embodiment has been discussed in connection with an example in which air exiting the diffuser 19 located downstream of the compressor 3 is utilized for the cooling air CA, air from other parts of the interior of the gas turbine 1 can also be utilized for the cooling air CA. For instance, bleed air from an intermediary stage of the compressor 3 may be utilized for the cooling air CA.

As described thus far, the gas turbine 1 in accordance with the instant embodiment can exploit the force of inertia that acts the foreign particles P to capture the foreign particles P in the cooling air CA within the chambers 45. In addition, since the chambers 45 are formed so that the swirl zone angle α is equal to or greater than the chamber angle β, the foreign particles P captured within the chambers 45 are prevented from falling off to the side of the turbine 7 even when the gas turbine 1 has stopped. Thus, it is possible to get rid of the foreign particles P that has entered the cooling air CA for the turbine 7 in an effective way.

Also, in the instant embodiment, the gas turbine 1 includes the pre-swirl nozzle member 43 which comprises a ring-shaped block element in which a plurality of cooling air supply bores defining the cooling air supply passages 41 are formed, such that the chambers 45 are defined in the pre-swirl nozzle member 43. For instance, the pre-swirl nozzle member 43 in this context can have circular cavities formed therein to define the chambers 45. According to this configuration, the cooling air supply passages 41 and chambers 45 of the aforementioned designs can be formed with ease and at a low cost.

In the instant embodiment, the chambers 45 can comprise the filter 51 which captures the foreign particles P flowing into the chambers 45 while allowing air to pass through the filter 51. According to this configuration, the foreign particles P can be captured in a more efficient manner.

In the instant embodiment, the filter 51 can be detachably arranged for the chambers 45. According to this configuration, replacement and maintenance of the filter 51 become easy.

In the instant embodiment, the chambers 45 can comprise the flow rate regulator mechanism 55 which regulates the flow rate of air exiting the chambers 45. According to this configuration, it becomes easier to set a proper flow rate for achieving efficient capture of the foreign particles P, that is, a flow rate that can, by means of the flow rate regulator mechanism 55, compensate for the loss of flow in a cooling air supply passage 41 that is caused by the provision of the chambers 45 to achieve effective capture of the foreign particles P.

While preferred embodiments of the present disclosure have been described thus far with reference to the drawings, various additions, modifications, or omissions can be made therein without departing from the principle of the present disclosure and are, thus, encompassed within the scope of the present disclosure.

REFERENCE SYMBOLS

1 . . . gas turbine engine
3 . . . compressor
5 . . . combustor
7 . . . turbine
41 . . . cooling air supply passage
41a . . . entry zone
41b . . . swirl zone
45 . . . chamber
51 . . . filter
55 . . . flow rate regulator mechanism
P . . . foreign particle

What is claimed is:

1. A gas turbine engine comprising:
a compressor which pressurizes air taken in from an ambient environment;
a combustor which combusts an air-fuel mixture containing a fuel and the air pressurized by the compressor;
a turbine powered by combustion gas produced by the combustor;
a cooling air supply passage which feeds the air from the compressor, as a cooling medium, to the turbine by swirling the air in a circumferential direction, the cooling air supply passage including:
an entry zone to which the air enters; and
a swirl zone in which the air flowing past the entry zone is circumferentially redirected with respect to an engine rotational axis;
a chamber which branches from the swirl zone and captures foreign particles in the air, the chamber being formed to meet the relation: $\alpha \geq \beta$ where, when viewed in a radial direction with respect to the engine rotational axis, $\alpha$ is an angle defined by the swirl zone relative to an entry direction and $\beta$ is an angle defined between the chamber and the swirl zone; and
a pre-swirl nozzle member including a ring-shaped block element in which a plurality of cooling air supply bores defining the cooling air supply passage are formed, such that the chamber is defined in the pre-swirl nozzle member.

2. The gas turbine engine as claimed in claim 1, wherein the chamber comprises an orifice which is located at a downstream end of the chamber and regulates a flow rate of air exiting the chamber.

3. The gas turbine engine as claimed in claim 1, wherein the pre-swirl nozzle member has a circular cavity formed therein to define the chamber.

4. A gas turbine engine comprising:
a compressor which pressurizes air taken in from an ambient environment;
a combustor which combusts an air-fuel mixture containing a fuel and the air pressurized by the compressor;
a turbine powered by combustion gas produced by the combustor;
a cooling air supply passage which feeds the air from the compressor, as a cooling medium, to the turbine by swirling the air in a circumferential direction, the cooling air supply passage including:

an entry zone to which the air enters; and a swirl zone in which the air flowing past the entry zone is circumferentially redirected with respect to an engine rotational axis; and a chamber which branches from the swirl zone and captures foreign particles in the air, the chamber being formed to meet the relation: $\alpha \geq \beta$ where, when viewed in a radial direction with respect to the engine rotational axis, $\alpha$ is an angle defined by the swirl zone relative to an entry direction and $\beta$ is an angle defined between the chamber and the swirl zone, wherein the chamber comprises a filter which captures the foreign particles flowing into the chamber while allowing air to pass through the filter.

5. The gas turbine engine as claimed in claim 4, wherein the filter is detachably arranged for the chamber.

* * * * *